US009534697B2

(12) United States Patent
Patterson (10) Patent No.: US 9,534,697 B2
(45) Date of Patent: Jan. 3, 2017

(54) FOOT OPERATED WATER SHUTOFF (71) Applicant: Stephen Hugh Patterson, Lancaster, NY (US)

(72) Inventor: Stephen Hugh Patterson, Lancaster, NY (US)

( * ) Notice: Subject to any disclaimer, the term of this patent is extended or adjusted under 35 U.S.C. 154(b) by 0 days.

(21) Appl. No.: 14/170,356

(22) Filed: Jan. 31, 2014

(65) Prior Publication Data

US 2015/0219240 A1    Aug. 6, 2015

(51) Int. Cl.
*F16K 7/06*    (2006.01)

(52) U.S. Cl.
CPC ..................... *F16K 7/063* (2013.01)

(58) Field of Classification Search
CPC ............ F16K 31/62; F16K 7/063; F16L 55/10
USPC ........... 251/4, 9, 10, 95, 101, 107, 108, 109, 111,251/114, 115
See application file for complete search history.

(56) References Cited

U.S. PATENT DOCUMENTS

| 1,347,931 | A | * | 7/1920 | Bowes, Jr. ..................... 251/10 |
| 2,639,729 | A | * | 5/1953 | Tulumello et al. ........... 137/635 |
| 3,759,115 | A | * | 9/1973 | Dibonaventura et al. ...... 74/512 |
| 4,022,235 | A | * | 5/1977 | Murray et al. .................. 137/38 |
| 5,199,119 | A | * | 4/1993 | Weber .............................. 4/619 |

* cited by examiner

*Primary Examiner* — Jessica Cahill
*Assistant Examiner* — Daphne M Barry
(74) *Attorney, Agent, or Firm* — Dunlap Bennett & Ludwig PLLC (57) ABSTRACT

A foot operated water shutoff can be used to control the flow of water through a hose, such as a garden hose. With the push of a user's foot, a user can regulate water pressure to a sprinkler, negating the need to pick up and shut off the water supply by pinching the hose or walking to the water faucet source to shut off or regulate the supply. The foot operated water shutoff includes a foot pedal that can pivot on a top member. The top member pivotably connects to the lower member, with a channel formed therethrough. A hose can be placed in the channel between the top and lower members and the top member can be secured against the lower member, with the foot pedal engaging the lower member in a step-wise manner to lock the top and lower members together in a desired position sandwiching the hose.

12 Claims, 7 Drawing Sheets

FOOT OPERATED WATER SHUTOFF

BACKGROUND OF THE INVENTION

The present invention relates to flow control devices and, more particularly, to a foot operated water shutoff device especially useful for use with ordinary garden hoses and sprinklers.

Many times, a hose bib is not conveniently located close to the place where a hose is used. For example, a person may run a hose from a hose bib located at a back side of a home to water a front lawn. If the person wants to move the sprinkler from one location to another, they must go to the back of the house to turn off the water, move the hose, and return to the back of the house to turn the water back on. Other current solutions may involve kinking the hose to obstruct flow. However, this method can still cause water to exit the hose and requires at least one hand of the user to keep the hose kinked while repositioning or adjusting the sprinkler.

In addition, many times it is helpful to adjust the flow of water out of a hose bib so that the sprinkler region is limited to desired areas and water is not wasted by sprinkling a driveway, road, or the like. Adjusting the water flow, however, can be difficult when the hose bib is not within sight of the sprinkler itself. Often times, multiple trips may be needed or another person can be used to make this adjustment.

As can be seen, there is a need for a device that can control the flow of water through a hose that can be easily manipulated and that can be placed at any location along a length of the hose.

SUMMARY OF THE INVENTION

In one aspect of the present invention, a flow regulation device comprises a lower member having a device pivot axis on a first side thereof and a plurality of teeth disposed on a second, opposite side thereof; an upper member having a first side pivoting with the lower member along the device pivot axis and a second side having a foot pedal axis disposed therein; and a foot pedal formed generally in an L-shape, the foot pedal having a top member disposed along the upper member and a side member extending toward the plurality of teeth of the lower member, the foot pedal pivotably connected at a corner of the L-shape to form the foot pedal axis with the upper member; and one or more foot pedal teeth formed along the side member of the foot pedal, the one or more foot pedal teeth configured to mate with the plurality of teeth on the lower member to hold the upper member in a desired position with respect to the lower member, wherein the top member of the foot pedal is resiliently urged away from the upper member and the side member of the foot pedal is resiliently urged toward the second, opposite side of the lower member.

In another aspect of the present invention, a flow regulation device comprises a lower member having a device pivot axis on a first side thereof and a plurality of teeth disposed on a second, opposite side thereof; an upper member having a first side pivoting with the lower member along the device pivot axis and a second side having a foot pedal axis disposed therein; a foot pedal formed generally in an L-shape, the foot pedal having a top member disposed along the upper member and a side member extending toward the plurality of teeth of the lower member, the foot pedal pivotably connected at a corner of the L-shape to form the foot pedal axis with the upper member; one or more foot pedal teeth formed along the side member of the foot pedal, the one or more foot pedal teeth configured to mate with the plurality of teeth on the lower member to hold the upper member in a desired position with respect to the lower member; a spring disposed between the top member of the foot pedal and the upper member, the spring resiliently urging the top member of the foot pedal away from the upper member and resiliently urging the side member of the foot pedal is toward the second, opposite side of the lower member; an opening in the top member of the foot pedal; and a raised member extending upward from the upper member, the raised member extending through the opening in the top member of the foot pedal.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a foot operated water shutoff device that can be used to control the flow of water through a hose, such as a garden hose. With the push of a user's foot, a user can regulate water pressure to a sprinkler, negating the need to pick up and shut off the water supply by pinching the hose or walking to the water faucet source to shut off or regulate the supply. The foot operated water shutoff device includes a foot pedal that can pivot on a top member of the device. The top member pivotably connects to the lower member, with a channel formed therethrough. A hose can be placed in the channel between the top and lower members and the top member can be secured against the lower member, with the foot pedal engaging with the lower member in a step-wise manner to lock the relative positions of the top and lower members in a desired position, with the hose therebetween.

Referring now to FIGS. 1 through 15, a foot operated shutoff device 10 (also referred to as shutoff 10 or device 10) can include a lower member 12 with an upper member 14 pivotably attached thereto about an axis 20. The connection between the lower member 12 and the upper member 14 can be achieved in various manners, including through a hinge-like connection, for example.

Figure 1:
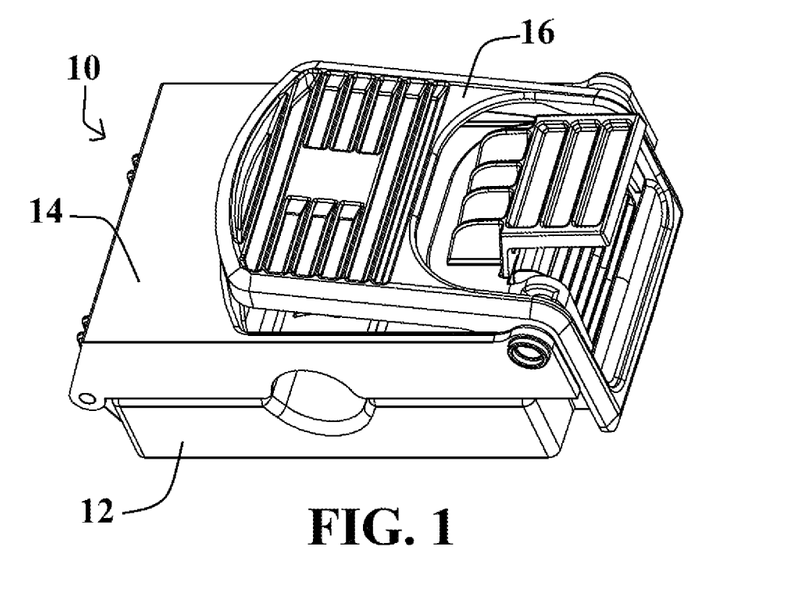
FIG. 1 is a perspective view of a foot operated water shutoff according to an exemplary embodiment of the present invention.
Figure 2:
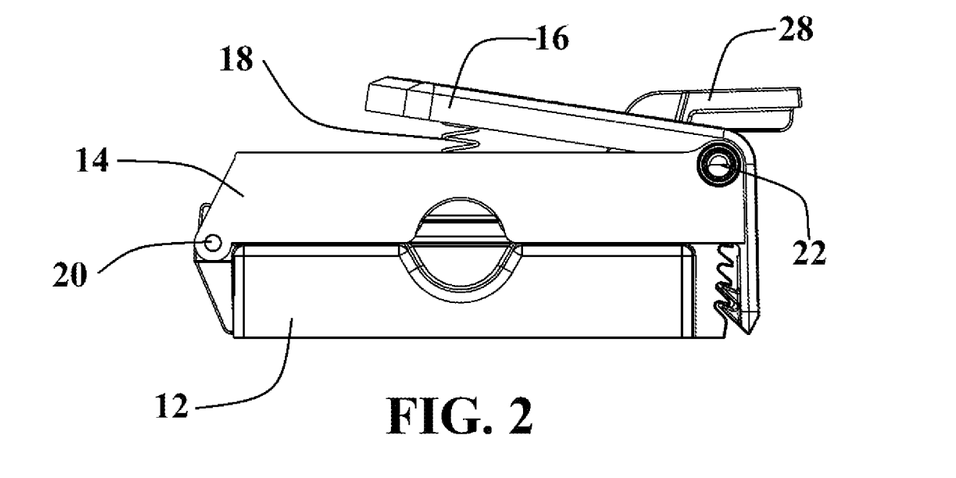
FIG. 2 is a side view of the foot operated water shutoff of FIG. 1.
Figure 3:
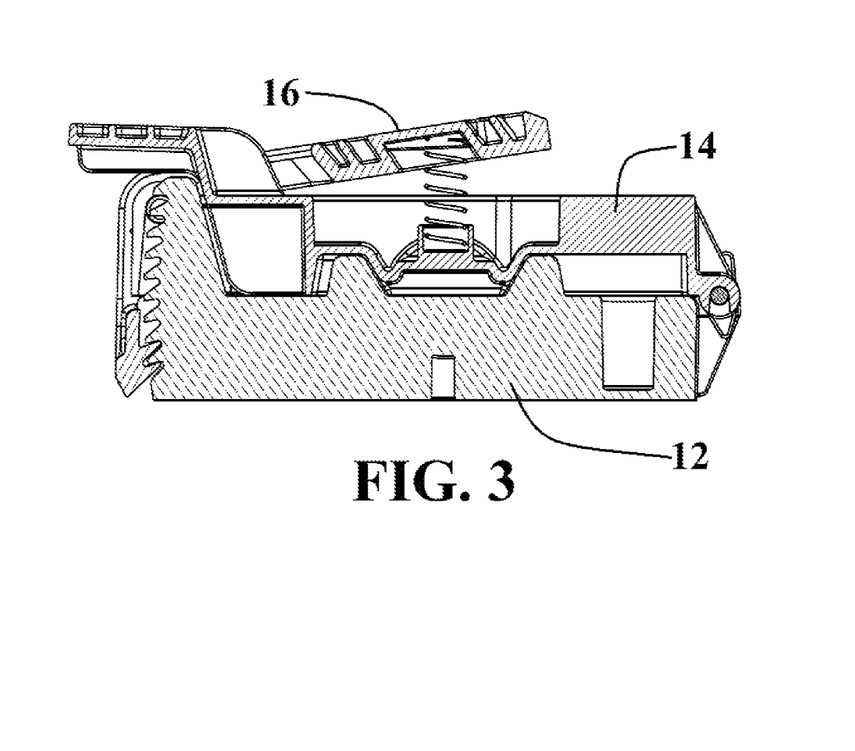
FIG. 3 is a cross-sectional view of the foot operated water shutoff of FIG. 1.
Figure 4:
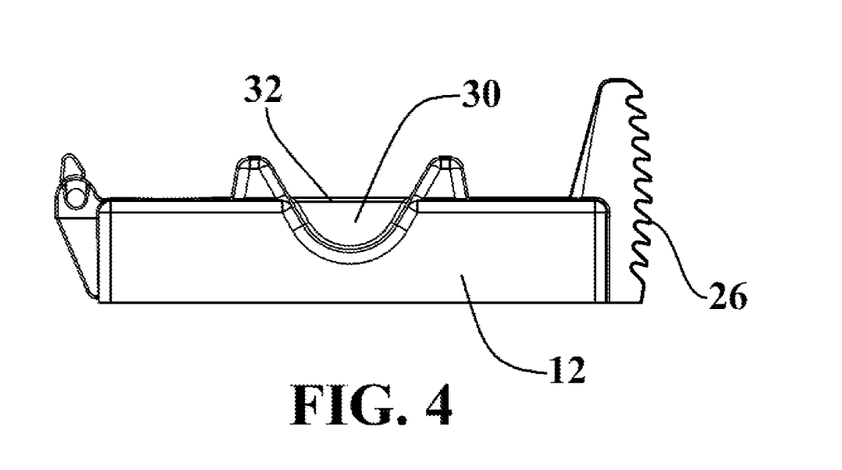
FIG. 4 is a side view of a bottom member of the foot operated water shutoff of FIG. 1.
Figure 5:
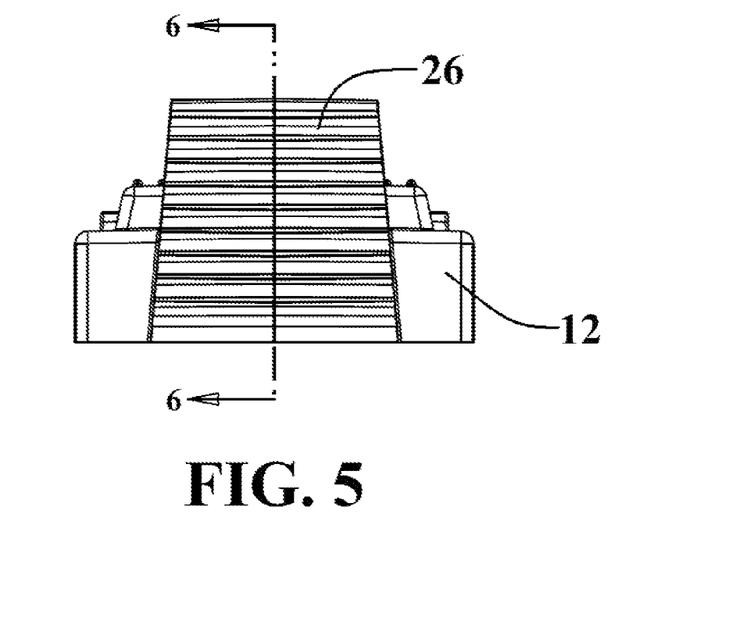
FIG. 5 is an end view of the bottom member of FIG. 4.
Figure 6:
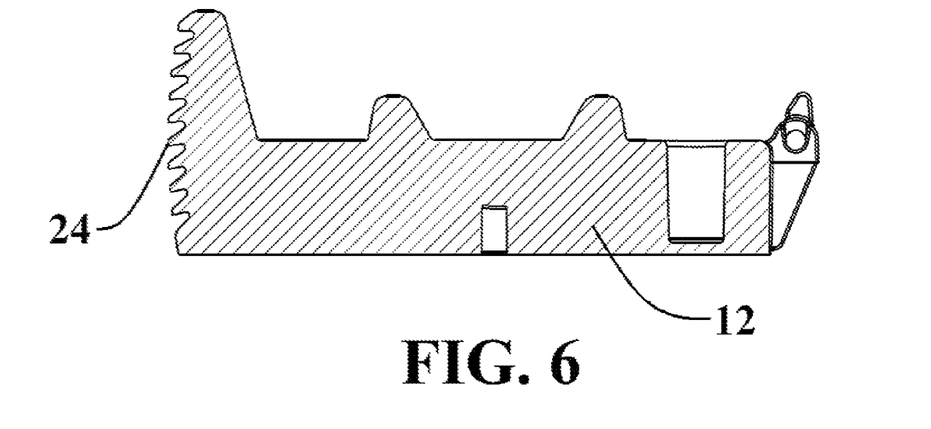
FIG. 6 is a cross sectional view taken along line 6-6 of FIG. 5.
Figure 7:
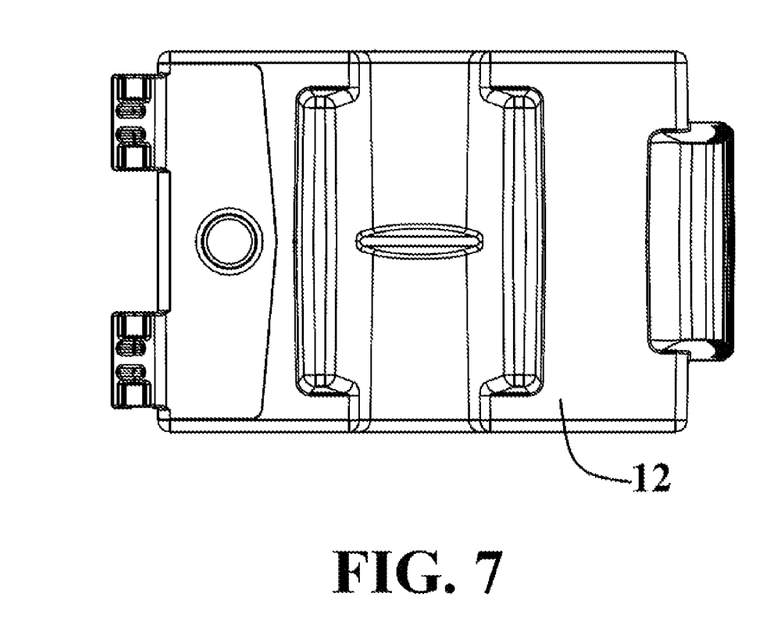
FIG. 7 is a top view of the bottom member of FIG. 4.
Figure 8:
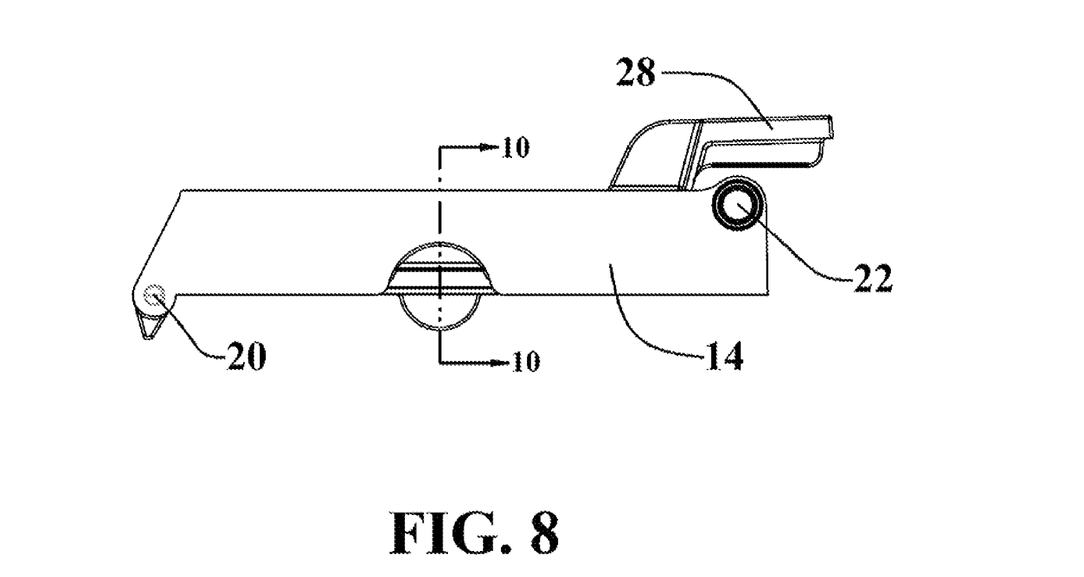
FIG. 8 is a side view of a top member of the foot operated water shutoff of FIG. 1.
Figure 9:
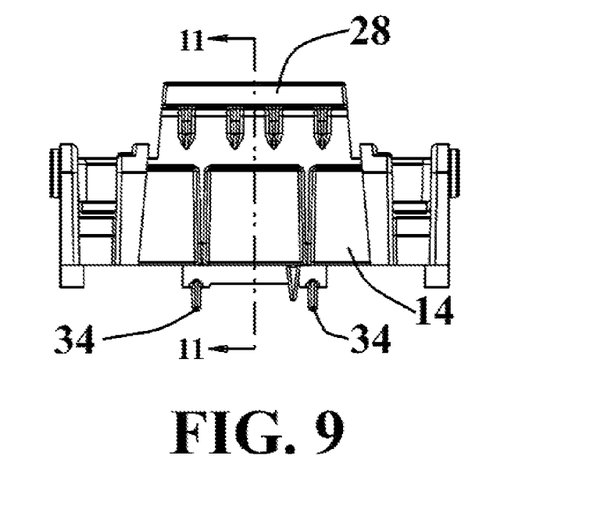
FIG. 9 is an end view of the top member of FIG. 8.
Figure 10:
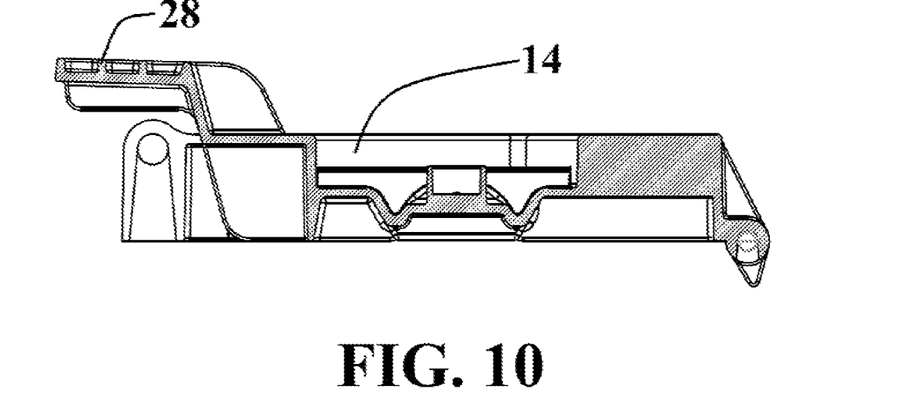
FIG. 10 is a cross-sectional view taken along line 10-10 of FIG. 8.
Figure 11:
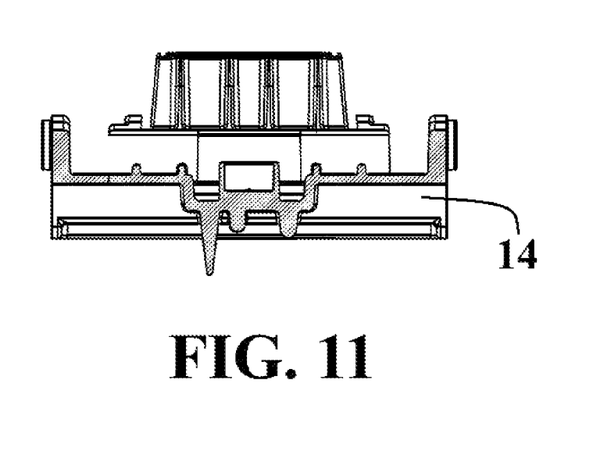
FIG. 11 is a cross-sectional view taken along line 11-11 of FIG. 9.
Figure 12:
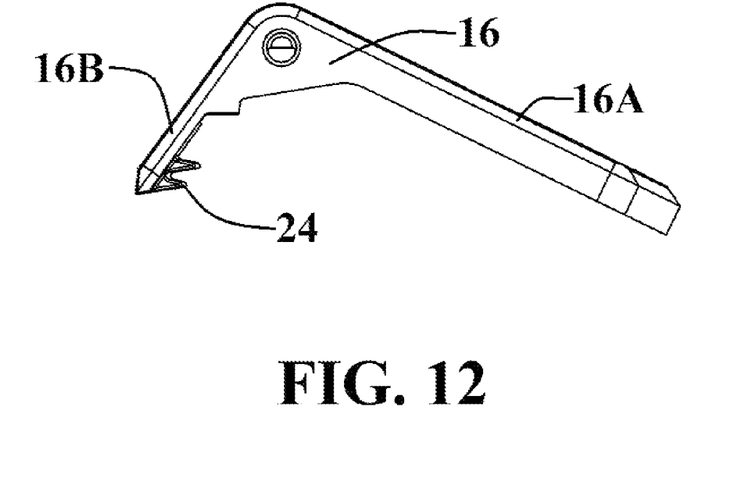
FIG. 12 is a side view of a latch member of the foot operated water shutoff of FIG. 1.
Figure 13:
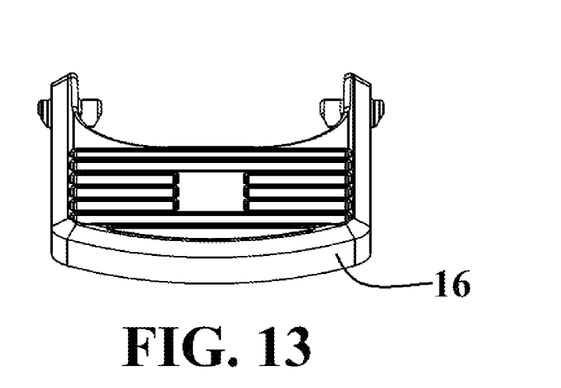
FIG. 13 is an end view of the latch member of FIG. 13.
Figure 14:
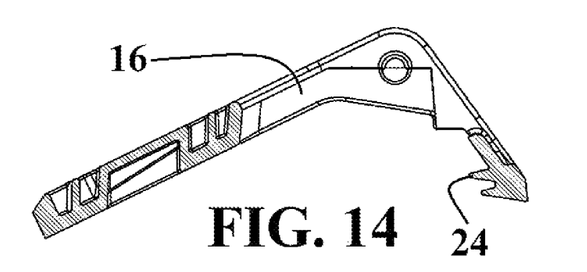
FIG. 14 is a cross-sectional view of the latch member of FIG. 13.
Figure 15:
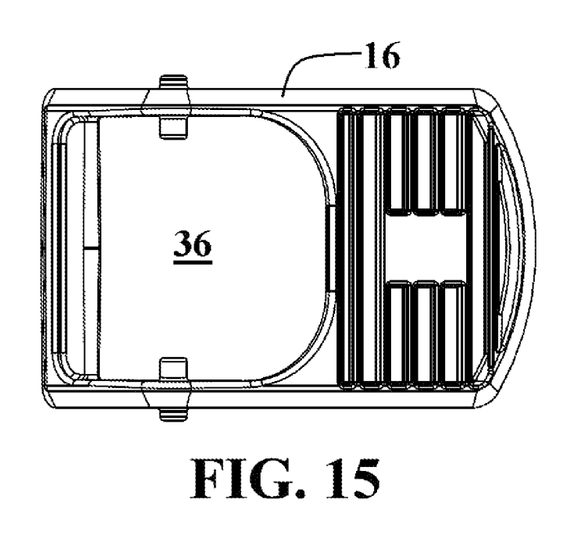
FIG. 15 is a top view of the latch member of FIG. 13.

A foot pedal 16 can pivotably attach to the upper member 14. Typically, the foot pedal 16 can pivot about an axis 22, where the axis 22 is located along the upper member 14 at a side opposite the axis 20 for the pivoting of the upper member 14 with the lower member 12. The foot pedal 16 can approximate an L-shape having an angle of about 90 degrees or slightly greater than 90 degrees. The foot pedal 16 can include a top member 16A, that is disposed along the upper surface of the upper member 14, and a side member 16B that extends away from the top member 16A to form the L-shape. The side member 16B can include teeth 24 extending from one edge thereof. At least one tooth 24 can be disposed on the side member 16B.

A spring 18 can urge the top member 16A of the foot pedal 16 away from the upper member 14, as shown in FIG. 2. This urging of the spring also urges the teeth 24 to engage with mating teeth 26 on the lower member 12. The mating teeth 26 on the lower member 12 can include a plurality of teeth 26 along one side edge thereof. The plurality of teeth 26 can have a pitch sufficient to receive the teeth 24 of the foot pedal 16 and allow for adjustment of the amount of opening between the upper member 14 and the lower member 12. For example, when a hose is placed between the upper member 14 and the lower member 12, the teeth 24 on the foot pedal 16 engages with the plurality of teeth 26. The upper member 14 can be pressed further toward the lower member 12, allowing the foot pedal 16 to pivot and to permit the teeth 24 thereof to engage a lower one of the plurality of teeth 26 on the lower member 12, thus locking the upper member 14 closer to the lower member 12.

The foot pedal 16 can include an opening 36 in the top member 16A thereof. A raised surface 28 of the upper member 14 can extend through the opening in the top member 16A to provide a foot press where the user can step to move the upper member 14 down toward the lower member 12.

The lower member 12 can include a channel 30 formed from one side to an opposite side thereof. The channel can be sized to receive a hose (not shown) therein. In some embodiments, a raised member 32 can be disposed to at least partially block the channel 30. This raised member 32 can be positioned so that as the upper member 14 is pivotably lowered onto the lower member 12, the raised member 32 creates a pinch point against a hose disposed therebetween.

The upper member 14 can also include one or more pinching members 34 that can fit into the channel 30 to help control the flow of water through a hose placed between the upper member 14 and the lower member 12. Of course, the Figures show one example of how the hose may be restricted and/or closed between the upper member 14 and the lower member 12. Other examples for restricting and/or closing a hose, as may be realized by one skilled in the art, are contemplated within the scope of the present invention. For example, the hose may simply rest in a channel formed in the lower member 12, while the upper member can include one or more protrusions to pinch the hose.

To use the foot operated shutoff device 10, a user would depress the foot pedal 16 to disengage the teeth 24, 26, allowing the upper member 14 to be pivoted open, away from the lower member 12. The user can then place a hose between the upper member 14 and the lower member 12. The spring 18 will resiliently urge the teeth 24 to engage with the teeth 26 as the upper member 14 is closed onto the lower member 12. The user can step on the raised portion 28 to effectively restrict the flow through the hose to a desired amount. If the user steps too hard on the raised portion 28, restricting the flow through the hose greater than desired, the user can step on the top member 16A of the foot pedal 16 to disengage the teeth 24, 26 and allow the upper member 14 to separate away from the lower member 12 (typically by the force of the hose expanding to permit flow therethrough). The user can then stop on the raised portion 28 of the upper member 14 to make a second attempt at adjusting the flow through the hose to a desired amount.

The foot operated shutoff device 10 can be made of various materials as may be known in the art, including plastic, composite, wood, metal, and the like, as well as combinations of such materials.

While the present invention describes the device 10 as a foot operated shutoff device, the device may not only shut off flow through a hose, but may also appropriate restrict the flow. This may be useful when adjusting the coverage of a sprinkler, for example. The device, while intended to be foot operated, may be operated by other means, including by a tool, one's hands or the like.

It should be understood, of course, that the foregoing relates to exemplary embodiments of the invention and that modifications may be made without departing from the spirit and scope of the invention as set forth in the following claims.

What is claimed is:

1. A flow regulation device comprising:
    a lower member having a device pivot axis on a first side thereof and a plurality of teeth disposed on a second, opposite side thereof;
    a lower channel carved out of the lower member so that the lower channel extends along a longitudinal axis parallel to the device pivot axis;
    an upper member having a first side pivoting with the lower member along the device pivot axis and a second side having a foot pedal axis disposed therein;
    a foot pedal formed generally in an L-shape, the foot pedal having a top member disposed along the upper member and a side member extending toward the plurality of teeth of the lower member, the foot pedal pivotably connected at a corner of the L-shape to form the foot pedal axis with the upper member;
    one or more foot pedal teeth formed along the side member of the foot pedal, the one or more foot pedal teeth configured to mate with the plurality of teeth on the lower member to hold the upper member in a desired position with respect to the lower member, wherein
    the top member of the foot pedal is resiliently urged away from the upper member and the side member of the foot pedal is resiliently urged toward the second, opposite side of the lower member; and
    at least one restriction member formed in the lower channel.

2. The flow regulation device of claim 1, further comprising a spring disposed between the top member of the foot pedal and the upper member.

3. The flow regulation device of claim 1, further comprising an opening in the top member of the foot pedal.

4. The flow regulation device of claim 3, further comprising a raised member extending upward from the upper member, the raised member extending through the opening in the top member of the foot pedal.

5. The flow regulation device of claim 1, further comprising an upper channel carved out of the upper member so that the upper channel aligns with the lower channel.

6. The flow regulation device of claim 5, further comprising at least one restriction member extending into the upper channel.

7. A flow regulation device comprising:
a lower member having a device pivot axis on a first side thereof and a plurality of teeth disposed on a second, opposite side thereof;
a lower channel carved out of the lower member so that the lower channel extends along a longitudinal axis parallel to the device pivot axis;
an upper member having a first side pivoting with the lower member along the device pivot axis and a second side having a foot pedal axis disposed therein;
a foot pedal formed generally in an L-shape, the foot pedal having a top member disposed along the upper member and a side member extending toward the plurality of teeth of the lower member, the foot pedal pivotably connected at a corner of the L-shape to form the foot pedal axis with the upper member;
one or more foot pedal teeth formed along the side member of the foot pedal, the one or more foot pedal teeth configured to mate with the plurality of teeth on the lower member to hold the upper member in a desired position with respect to the lower member;
a spring disposed between the top member of the foot pedal and the upper member, the spring resiliently urging the top member of the foot pedal away from the upper member and resiliently urging the side member of the foot pedal is toward the second, opposite side of the lower member;
an opening in the top member of the foot pedal;
a raised member extending upward from the upper member, the raised member extending through the opening in the top member of the foot pedal; and
at least one restriction member formed in the lower channel.

8. The flow regulation device of claim 7, further comprising:
an upper channel carved out of the upper member so that the upper channel aligns with the lower channel; and
at least one restriction member extending into the upper channel.

9. A flow regulation device comprising:
a lower member having a device pivot axis on a first side thereof and a plurality of teeth disposed on a second, opposite side thereof;
a lower channel carved out of the lower member so that the lower channel extends along a longitudinal axis parallel to the device pivot axis;
an upper member having a first side pivoting with the lower member along the device pivot axis and a second side having a foot pedal axis disposed therein;
a foot pedal formed generally in an L-shape, the foot pedal having a top member disposed along the upper member and a side member extending toward the plurality of teeth of the lower member, the foot pedal pivotably connected at a corner of the L-shape to form the foot pedal axis with the upper member;
one or more foot pedal teeth formed along the side member of the foot pedal, the one or more foot pedal teeth configured to mate with the plurality of teeth on the lower member to hold the upper member in a desired position with respect to the lower member, wherein
the top member of the foot pedal is resiliently urged away from the upper member and the side member of the foot pedal is resiliently urged toward the second, opposite side of the lower member;
an upper channel carved out of the upper member so that the upper channel aligns with the lower channel; and
at least one restriction member extending into the upper channel.

10. The flow regulation device of claim 9, further comprising a spring disposed between the top member of the foot pedal and the upper member.

11. The flow regulation device of claim 9, further comprising an opening in the top member of the foot pedal.

12. The flow regulation device of claim 11, further comprising a raised member extending upward from the upper member, the raised member extending through the opening in the top member of the foot pedal.

* * * * *